United States Patent
Wiegand

(10) Patent No.: US 8,014,751 B2
(45) Date of Patent: Sep. 6, 2011

(54) METHOD AND SYSTEM FOR ASSIGNING WIRELESS SPECIAL NUMBER CALL ROUTING AMONG CALL ANSWERING POSITIONS

(75) Inventor: Joshua Lawton Wiegand, Boulder, CO (US)

(73) Assignee: West Corporation, Omaha, NE (US)

( * ) Notice: Subject to any disclaimer, the term of this patent is extended or adjusted under 35 U.S.C. 154(b) by 687 days.

(21) Appl. No.: 12/105,521

(22) Filed: Apr. 18, 2008

(65) Prior Publication Data

US 2009/0264115 A1    Oct. 22, 2009

(51) Int. Cl.
*H04M 11/04* (2006.01)

(52) U.S. Cl. .................. 455/404.1; 455/404.2; 455/445; 379/37

(58) Field of Classification Search ............... 455/404.1, 455/404.2, 445; 379/37
See application file for complete search history.

(56) References Cited

U.S. PATENT DOCUMENTS

| | | | |
|---|---|---|---|
| 5,960,341 A | 9/1999 | LeBlanc et al. | |
| 6,226,512 B1 * | 5/2001 | Macaulay et al. | 455/414.1 |
| 6,256,489 B1 * | 7/2001 | Lichter et al. | 455/404.2 |
| 6,529,722 B1 * | 3/2003 | Heinrich et al. | 455/404.1 |
| 6,819,929 B2 | 11/2004 | Antonucci et al. | |
| 7,072,666 B1 | 7/2006 | Kullman et al. | |
| 7,085,650 B2 | 8/2006 | Anderson | |
| 2001/0021646 A1 | 9/2001 | Antonucci et al. | |
| 2002/0151313 A1 | 10/2002 | Stead | |
| 2002/0193121 A1 | 12/2002 | Nowak et al. | |
| 2003/0158668 A1 | 8/2003 | Anderson | |
| 2005/0209781 A1 | 9/2005 | Anderson | |
| 2006/0068753 A1 | 3/2006 | Karpen et al. | |
| 2006/0265195 A1 * | 11/2006 | Woodard et al. | 702/188 |
| 2007/0041368 A1 * | 2/2007 | Lorello | 370/352 |
| 2009/0088126 A1 * | 4/2009 | Rhodes et al. | 455/404.2 |

FOREIGN PATENT DOCUMENTS

EP           0705046         4/1996

* cited by examiner

*Primary Examiner* — Danh C Le

(57) ABSTRACT

A method for assigning special number wireless call routing responsibilities among special number call answering positions, each respective special number call answering position having a respective designated special number service area, includes: (a) in no particular order: (1) establishing a plurality of cell sector areas for wireless call service; and (2) establishing respective special number service areas in the vicinities of the plurality of cell sector areas; (b) associating respective cell sector areas with the respective special number service areas to establish cell sector-special number areas; (c) establishing at least one population area in the vicinity of the cell sector-special number areas; (d) associating the cell sector-special number areas with the at least one population area to establish cell sector-special number-population areas; (e) determining portions of population attributed to each respective cell sector-special number-population area; and (f) assigning the responsibilities in proportion with the portions of population.

12 Claims, 5 Drawing Sheets

| CELL SECTOR | CELL SECTOR MEAS. AREA | AGENCY | CELL SECTOR-SN-POP AREA ID | AGCY-CELL SECTOR MEAS. AREA | ZIP CODE | ZIP MEAS. AREA | ZIP POP | Cell Sector-SN-Pop Meas. Area | % ZIP MEAS. AREA | WEIGHTED POP | ROUTE AGENCY |
|---|---|---|---|---|---|---|---|---|---|---|---|
| 1 | 715 | C | 1C02 | 715 | 80202 | 4323 | 8780 | 210 | 4.85 | 425.83 | C |
| 1 | 715 | C | 1C03 | | 80203 | 1950 | 5570 | 505 | 25.89 | 1442.07* | C |
| 2 | 1713 | A | 2A02 | 440 | 80202 | 4323 | 8780 | 205 | 4.74 | 416.17 | B |
| 2 | 1713 | A | 2A03 | | 80203 | 1950 | 5570 | 235 | 12.05 | 671.18 | B |
| 2 | 1713 | B | 2B02 | 1048 | 80202 | 4323 | 8780 | 310 | 7.17 | 629.53 | B |
| 2 | 1713 | B | 2B03 | | 80203 | 1950 | 5570 | 738 | 37.84 | 2107.69* | B |
| 2 | 1713 | C | 2C03 | 225 | 80203 | 1950 | 5570 | 225 | 11.53 | 642.22 | B |
| 3 | 1812 | A | 3A02 | 587 | 80202 | 4323 | 8780 | 405 | 9.36 | 821.81 | C |
| 3 | 1812 | A | 3A03 | | 80203 | 1950 | 5570 | 182 | 9.33 | 519.68 | C |
| 3 | 1812 | C | 3C02 | 1225 | 80202 | 4323 | 8780 | 945 | 21.85 | 1918.43* | C |
| 3 | 1812 | C | 3C03 | | 80203 | 1950 | 5570 | 280 | 14.61 | 813.78 | C |

FIG. 4

METHOD AND SYSTEM FOR ASSIGNING WIRELESS SPECIAL NUMBER CALL ROUTING AMONG CALL ANSWERING POSITIONS

FIELD OF THE INVENTION

The present invention is directed to wireless telecommunication systems, and especially to routing wireless special number calls to special number answering positions.

BACKGROUND OF THE INVENTION

Examples of such special number calls include 9-1-1 calls for seeking emergency services and other abbreviated number calls for non-emergency special services, such as "N-1-1" systems. Examples of such N-1-1 systems include "3-1-1" (urgent but not emergency calls) and "5-1-1" (traffic inquiry calls). Special number calls may also include, by way of further example and not by way of limitation, abbreviated numbers for calling commercial services, such as "*820" (calling a radio station) or "GOTIX" (calling for tickets).

For purposes of illustration, by way of example and not by way of limitation, the present invention will be described in the context of an emergency service network in the United States, commonly referred to as a 9-1-1 network. The teachings of the present invention are equally applicable, useful and novel in other special number calling systems, such as maintenance service networks, college campus security networks, abbreviated number networks for calling commercial services and other networks.

Wireless E9-1-1 can be separated into Phase I and Phase II technologies. Phase I requires that a calling party's mobile telephone number and location of the cell site and sector from which the 9-1-1 call originated be delivered to a responding Public Safety Answering Point (PSAP; sometimes referred to as a Public Safety Answering Position). The mobile telephone number of the caller can be used by the PSAP to call back in the event that the connection is lost. The location of the cell site and cell sector assist in transferring the 9-1-1 call to another appropriate PSAP that may be advantageously located for providing required emergency services.

Phase II requires that the mobile telephone number and location (latitude and longitude) of the caller be delivered to the PSAP within a specified accuracy margin.

Call routing based on population can be relevant to the routing of Phase I wireless 9-1-1 calls. Once a PSAP has submitted a formal request for service from a Wireless Service Provider (WSP), the WSP has 180 days to deploy Phase I. If the WSP is unable to provide the service within the specified time frame, the Federal Communications Commission may levy fines.

The WSP and PSAP generally work closely to ensure the timely deployment of Phase I and may, during the planning process, provide documentation such as a map setting out jurisdictional boundaries of one or more PSAPs and a boundary map indicating cell towers and cell sectors.

Cell tower and cell sector location information, latitude, longitude, and cell sector radius are among data that may be obtained from a WSP. By way of example and not by way of limitation, data may be received in the form of an on-line spreadsheet such as an Excel® Spreadsheet. A Wireless Implementation Specialist (WIS) or other planner converts the data received in the spreadsheet into an on-line file (such as, by way of example and not by way of limitation, a file in ".dbf" format) and imports the information and data to a Geographic Information Service (GIS) file, such as an Arc-View® file, preferably as a point theme. In analyzing the data, a WIS may assign a cell tower that lies within a respective PSAP polygon boundary to that particular PSAP for Phase I call routing. If a cell tower lies near the boundary of two PSAPs, the WIS may suggest to the involved PSAPs which PSAP should receive calls from the nearby tower. The WIS merely "suggests" because a PSAP makes the decision whether it desires to accept Phase I wireless 9-1-1 calls from a particular cell tower or cell sector.

One problem with the current approach described above is that call routing is performed based on a point feature. That is, cell towers are points (a latitude and longitude), but cell sectors are polygon features. Jurisdictional boundaries of PSAPs are also polygon features. A consequence of these differing characteristics relating to cell towers, cell sectors and jurisdictional boundaries of PSAPs is that wireless 9-1-1 calls may be routed based on cell sector for certain Phase I technological solutions. A cell tower may lie completely within the jurisdictional boundary for a first PSAP A, but one sector of the cell tower may lie almost entirely within the jurisdictional boundary for a second PSAP B lying adjacent with PSAP A. By the current approach, the recommended routing of all sectors of the exemplary tower would go to PSAP A, even though PSAP B or even another PSAP may be a more logical choice. Trial and error methods for determining a more efficient line-up between cell sectors and PSAPs is time consuming and prone to inaccuracies.

There is a need for a method and system for assigning wireless special number call touring among call answering positions for handling special number calls that provides a logical basis for determining a line-up between cell sectors and special number call answering positions.

SUMMARY OF THE INVENTION

A method for assigning special number wireless call routing responsibilities among special number call answering positions, each respective special number call answering position having a respective designated special number service area, includes: (a) in no particular order: (1) establishing a plurality of cell sector areas for wireless call service; and (2) establishing respective special number service areas in the vicinities of the plurality of cell sector areas; (b) associating respective cell sector areas with the respective special number service areas to establish cell sector-special number areas; (c) establishing at least one population area in the vicinity of the cell sector-special number areas; (d) associating the cell sector-special number areas with the at least one population area to establish cell sector-special number-population areas; (e) determining portions of population attributed to each respective cell sector-special number-population area; and (f) assigning the responsibilities in proportion with the portions of population.

A system for assigning emergency service wireless call routing responsibilities among a plurality of emergency service call answering positions; each respective emergency service call answering position of the plurality of emergency service call answering positions having a respective designated emergency service area; the emergency service wireless call routing being effected via a plurality of cell sector areas; includes: at least one computing apparatus; the at least one computing apparatus operating to effect associating respective cell sector areas of the plurality of cell sector areas with the respective emergency service areas to establish cell sector-emergency service areas; operating to effect establishing at least one population area in the vicinity of the cell sector-emergency service areas; operating to effect associating the cell sector-emergency service areas with the at least one population area to establish cell sector-emergency service-population areas; operating to effect determining portions of population attributed to each respective the cell sector-emergency service-population area; and operating to effect assigning the responsibilities in proportion with the portions of population.

It is, therefore a feature of the present invention to provide a method and system for assigning wireless special number call touring among call answering positions for handling special number calls that provides a logical basis for determining a line-up between cell tower sectors and special number call answering positions.

Further features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 4 is a tabulation of information and calculations associated with the information displayed in FIG. 3.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
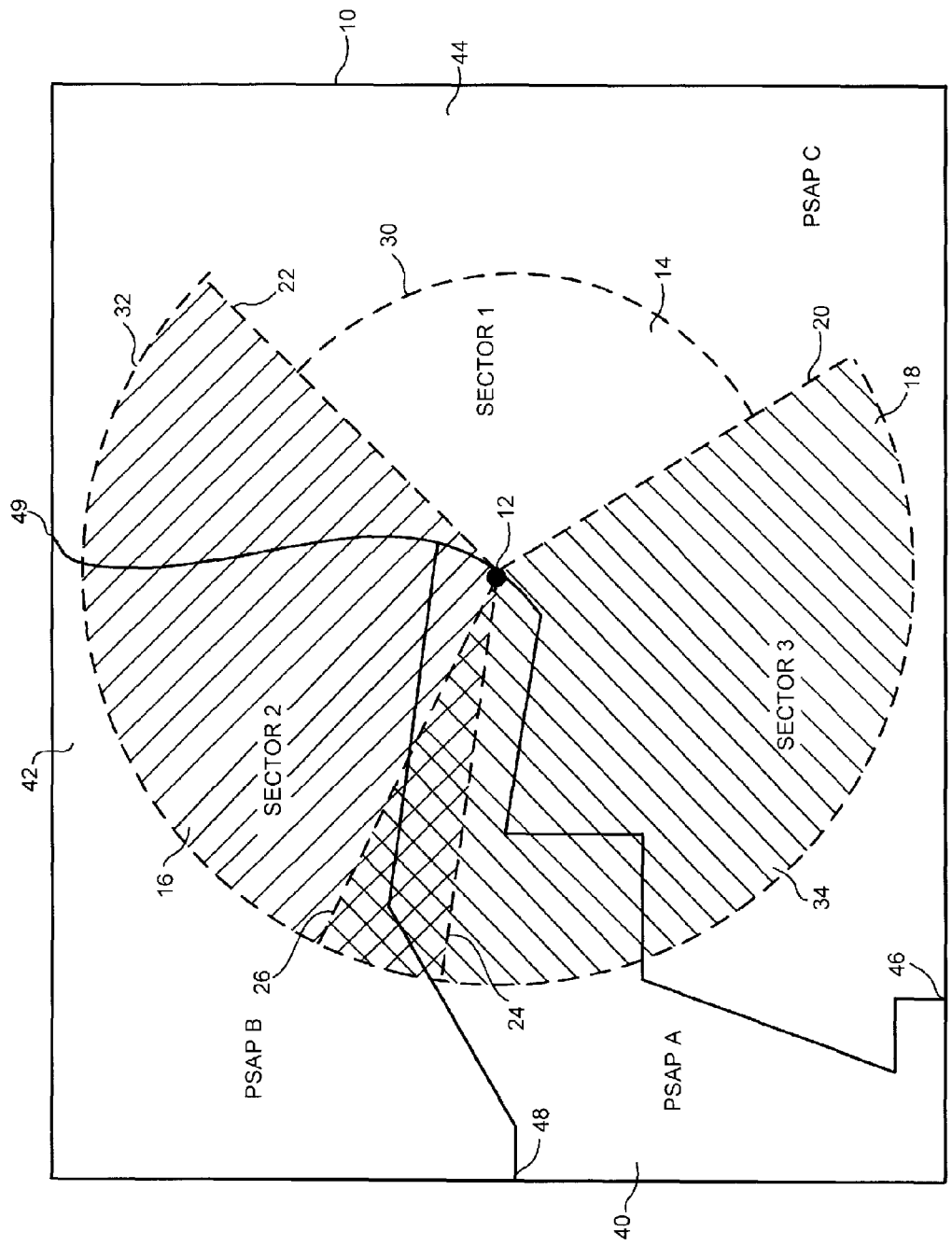
FIG. 1 is a schematic diagram illustrating a wireless communication tower, associated call sectors and coincident jurisdictions for special number answering positions.

FIG. 1 is a schematic diagram illustrating a wireless communication tower, associated cell sectors and coincident jurisdictions or service areas for special number answering positions. In FIG. 1, a geographic area 10 encloses a wireless telephone tower 12. Wireless telephone tower 12 may be embodied, by way of example and not by way of limitation, in a cellular telephone tower, sometimes referred to as a cell tower. For purposes of this description, wireless telephone tower 12 will be hereinafter referred to as cell tower 12.

Cell tower 12 effects wireless coverage for carrying out wireless communication in a Cell Sector 1, indicated by a reference numeral 14, in a Cell Sector 2, indicated by a reference numeral 16, and in a Cell Sector 3, indicated by a reference numeral 18. Cell Sector 1 is generally bounded by radii 20, 22 substantially centered at cell tower 12. Cell Sector 2 is generally bounded by radii 22, 24 substantially centered at cell tower 12. Cell Sector 3 is generally bounded by radii 26, 20 substantially centered at cell tower 12. Radii 24, 26 are arranged in a manner that establishes Cell Sector 2 in an overlapping orientation with respect to Cell Sector 3.

Cell Sector 1 is further bounded by an arcuate range limit 30. Cell Sector 2 is further bounded by an arcuate range limit 32. Cell Sector 3 is further bounded by an arcuate range limit 34. Range limits 30, 32, 34 may be different from each other because of various factors such as, by way of example and not by way of limitation, different transmitter powers, different receiver sensitivities, different atmospheric conditions, different topography traversed by signals in different cell sectors, different other obstacles in various cell sectors such as buildings, trees and other obstacles. In FIG. 1, range limits 32, 34 are substantially equally displaced from cell tower 12, and range limit 30 is displaced a shorter distance from cell tower 12.

Geographic area 10 also contains at least portions of jurisdictional or service areas for answering special number calls. In FIG. 1 the special number calls to which response is illustrated are 9-1-1 emergency service calls, and the responding entities are embodied in a Public Safety Answering Point (PSAP; sometimes referred to as a Public Safety Answering Position). PSAPs are assigned jurisdictional or service areas in which each respective PSAP coordinates providing emergency services such as, by way of example and not by way of limitation, fire, police emergency medical or other service. PSAP jurisdictional boundaries are not necessarily regular polygons on a map, but may be quite irregular in shape having been driven by one or more of several factors such as, by way of example and not by way of limitation, city or county boundaries, tax districts, geographical features, population or other factors.

Geographic area 10 includes a jurisdictional area 40 served by a PSAP A (not shown in detail in FIG. 1), a jurisdictional area 42 served by a PSAP B (not shown in detail in FIG. 1) and a jurisdictional area 44 served by a PSAP C (not shown in detail in FIG. 1). Jurisdictional area 40 is bounded at area extremes 46, 48 and abuts at least a portion of jurisdictional areas 42, 44. Jurisdictional area 42 is bounded at area extremes 48, 48 and abuts at least a portion of jurisdictional areas 40, 44. Jurisdictional area 44 is bounded at area extremes 49, 46 and abuts at least a portion of jurisdictional areas 40, 42. Jurisdictional areas 40, 42, 44 may extend beyond geographic area 10.

Cell Sector-Special Number Areas are thus established. Cell Sector 1 is entirely within the service area for PSAP C and thus constitutes a single Cell Sector-Special Number Area. Cell Sector 2 overlays portions of service areas for PSAP A, PSAP B and PSAP C, thereby establishing three Cell Sector-Special Number Areas. Cell Sector also overlays portions of service areas for PSAP A, PSAP B and PSAP C, thereby also establishing three Cell Sector-Special Number Areas. Such "overlaying" of two-dimensional representation of geographic features to obtain or identify Cell Sector-Special Number Areas may be advantageously effected using a computing apparatus using a Geographic Information Service (GIS) file, such as an ArcView® file.

A problem may arise when one plans routing of wireless 9-1-1 emergency service calls using prior art techniques by which PSAP A may be assigned to receive calls originating from cell tower 12 |because$_{[jw1]}$ cell tower 12 lies within jurisdictional area 40. Simple inspection of FIG. 1 may lead one to conclude that calls from jurisdictional areas 42, 44 may also be advantageously received via cell tower 12.

It would be useful to have a rational basis for deciding which calls should be received by which Cell Sector 14, 16, 18 of cell tower 12 for service to jurisdictional areas 40, 42, 44 serving PSAP A, PSPA B and PSAP C. It would be particularly useful if such a rational basis for deciding could be effected as part of an automated process.

Figure 2:
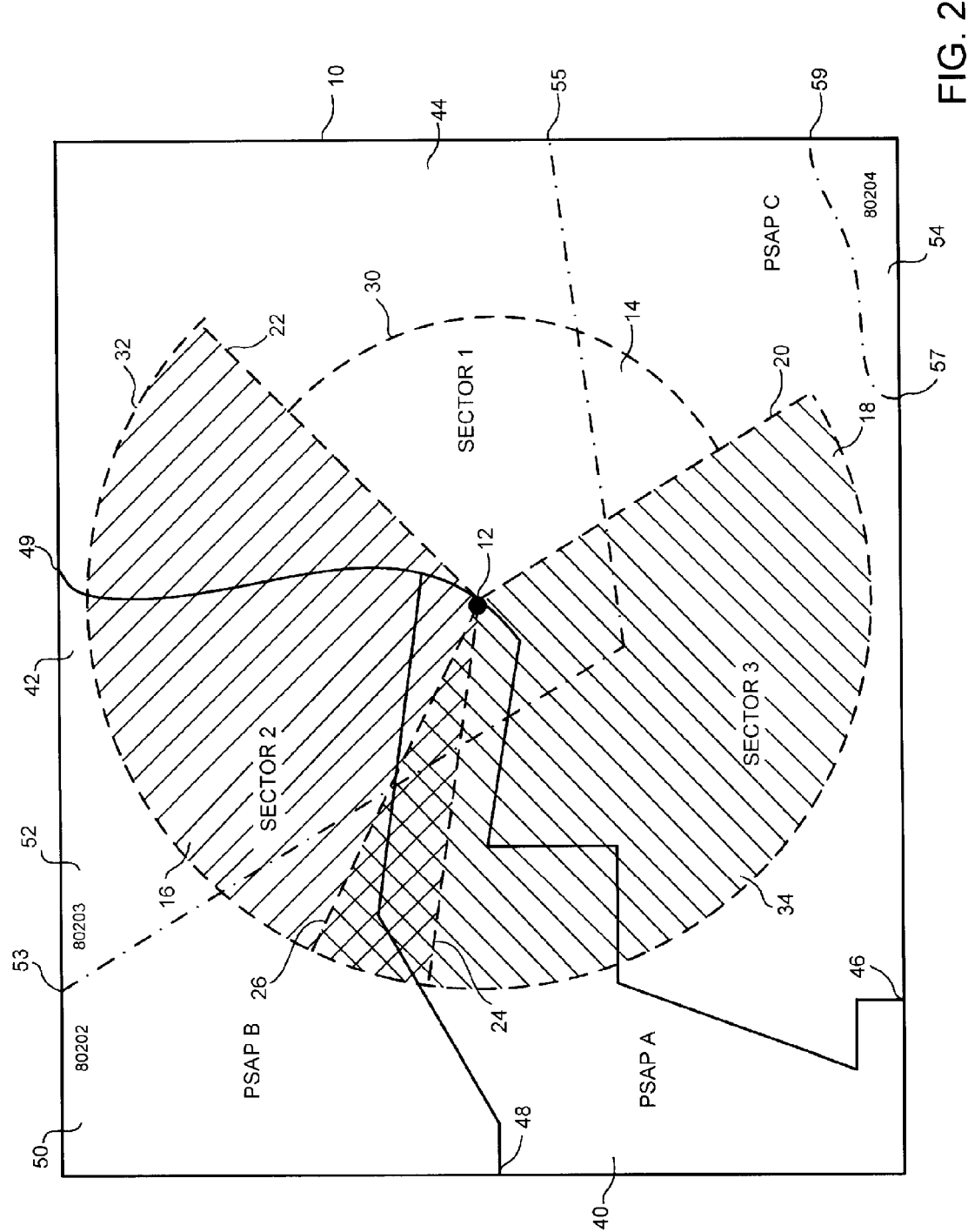
FIG. 2 is a schematic diagram illustrating the features provided in FIG. 1 with coincident postal delivery zones also indicated.

FIG. 2 is a schematic diagram illustrating the features provided in FIG. 1 with coincident population zones also indicated. Population zones are embodied in exemplary postal delivery zones or ZIP Code Zones in FIG. 2. In FIG. 2, geographic area 10 is illustrated substantially as described in connection with FIG. 1 using substantially the same reference numerals, with the addition of population information embodied in postal delivery zones 50, 52, 54. Postal delivery zone 50 is bounded at area extremes 53, 55 and abuts at least a portion of postal delivery zones 52, 54. Postal delivery zone 52 is bounded at area extremes 53, 55 and abuts at least a portion of postal delivery zone 50. Postal delivery zone 54 is bounded at area extremes 57, 59 and abuts at least a portion of postal delivery zone 50. By way of example and not by way of limitation, postal delivery zone 50 may be designated by a postal ZIP Code Zone 80202, postal delivery zone 52 may be designated by a postal ZIP Code Zone 80203 and postal delivery zone 54 may be designated by a postal ZIP Code Zone 80204. Postal delivery zones 50, 52, 54 may extend beyond geographic area 10.

Figure 3:
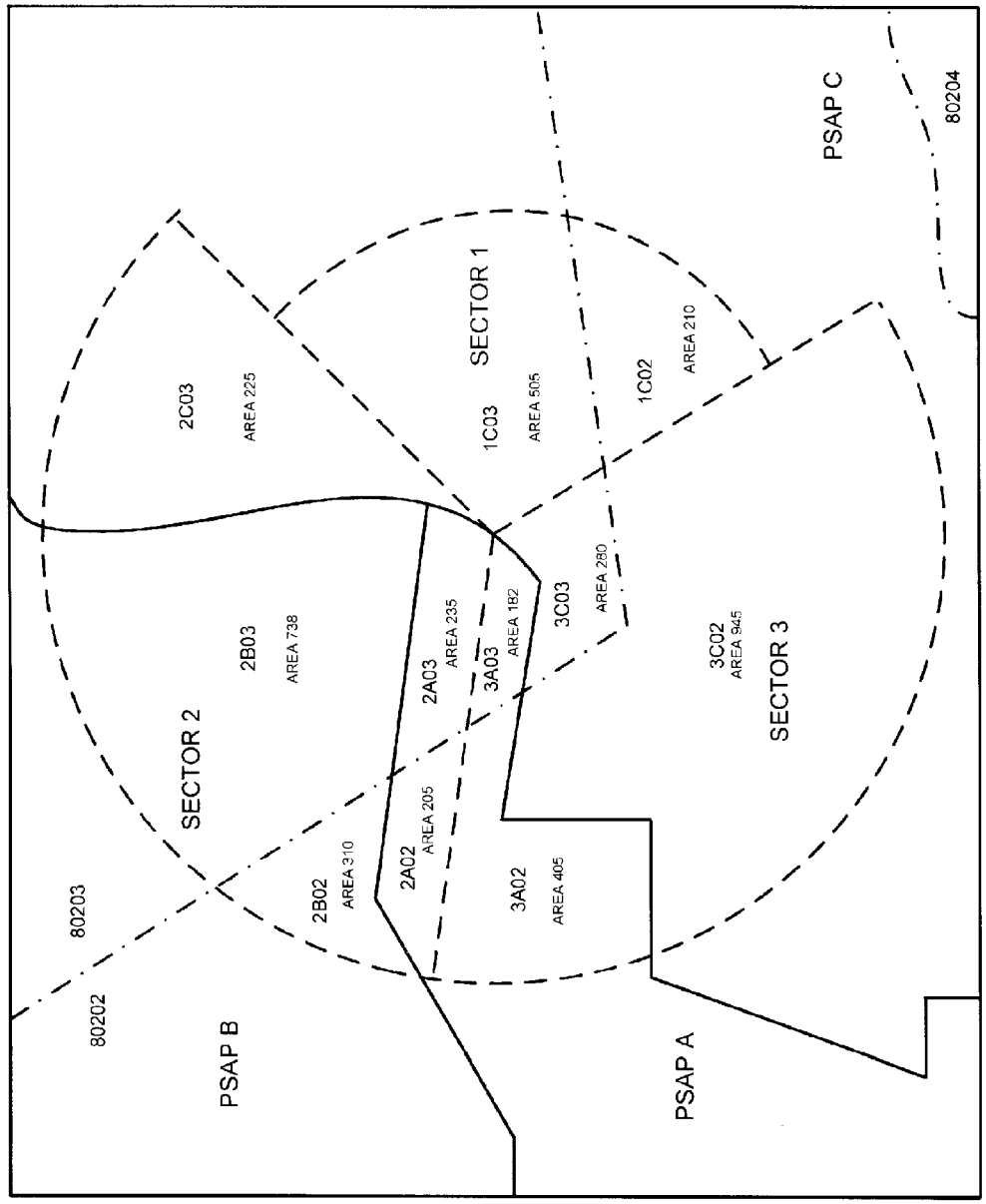
FIG. 3 is a schematic diagram illustrating the features provided in FIG. 2 with additional information indicated for use in aiding routing of wireless calls from the wireless communication tower among the jurisdictions for special number answering positions.

FIG. 3 is a schematic diagram illustrating the features provided in FIG. 2 with additional information indicated for use in aiding routing of wireless calls from the wireless communication tower among the jurisdictions for special number answering positions. In FIG. 3, reference numerals provided in FIGS. 1 and 2 are omitted in order to reduce confusion. Also to reduce clutter and confusion in FIG. 3, radius 26 associated with Sector 3 has been omitted; Radius 24 could have been omitted instead of radius 26 without significantly affecting the application of the method of the present invention. Various areas in FIG. 3 are indicated by reference to an area's respective location in a jurisdictional area served by PSAP A, PSAP B or PSAP C; location within one of Cell Sector 1, Cell Sector 2 or Cell Sector 3; and location within postal ZIP Code Zone 80202 or 80203. None of the areas covered by Cell Sector 1, Cell Sector 2 or Cell Sector 3 lie within postal Zip Code Zone 80204.

As annotated in FIG. 3, Cell Sector 1 lies entirely within the jurisdictional or service area associated with PSAP C and within ZIP Code Zones 80202 and 80203. Accordingly, Sector 1 contains a Cell Sector-Special Number-Population Area having an identification (ID) 1C03 (Cell Sector 1, PSAP C, ZIP Code 80203) and a Cell Sector-Special Number-Population Area having an ID 1C02 (Cell Sector 1, PSAP C, ZIP Code 80202). Cell Sector 2 lies partly in the jurisdictional area or service associated with PSAP A, partly in the jurisdictional area or service associated with PSAP B and partly in the jurisdictional area or service associated with PSAP C. Accordingly, Cell Sector 2 contains a Cell Sector-Special Number-Population Area having an ID 2C03 (Cell Sector 2, PSAP C, ZIP Code 80203), a Cell Sector-Special Number-Population Area having an ID 2B02 (Cell Sector 2, PSAP B, ZIP Code 80202), a Cell Sector-Special Number-Population Area having an ID 2B03 (Cell Sector 2, PSAP B, ZIP Code 80203), a Cell Sector-Special Number-Population Area having an ID 2A02 (Cell Sector 2, PSAP A, ZIP Code 80202) and a Cell Sector-Special Number-Population Area having an ID 2A03 (Cell Sector 2, PSAP A, ZIP Code 80203). Cell Sector 3 lies partly in the jurisdictional or service area associated with PSAP A and partly in the jurisdictional or service area associated with PSAP C. Accordingly, Cell Sector 3 contains a Cell Sector-Special Number-Population Area having an ID 3A02 (Cell Sector 3, PSAP A, ZIP Code 80202), a Cell Sector-Special Number-Population Area having an ID 3A03 (Sector 3, PSAP A, ZIP Code 80203), a Cell Sector-Special Number-Population Area having an ID 3C02 (Cell Sector 3, PSAP C, ZIP Code 80202) and a Cell Sector-Special Number-Population Area having an ID 3C03 (Cell Sector 3, PSAP C, ZIP Code 80203). Such "overlaying" of two-dimensional representation of geographic features to obtain or identify Cell Sector-Special Number-Population Areas may be advantageously effected using a computing apparatus using a Geographic Information Service (GIS) file, such as an ArcView® file.

FIG. 3 also presents a respective measured area for each respective Cell Sector-Special Number-Population Area. The units employed for measured area are not important for purposes of the present invention because only relative measured areas are employed. For purposes of illustration only, measured areas are indicated in FIG. 3 in mi$^2$ (square miles). Sector-Areas have the following respective measured areas:

| CELL SECTOR-SN-POP AREA ID | CELL SECTOR-SN-POP MEASURED AREA |
| --- | --- |
| 1C02 | 210 |
| 1C03 | 505 |
| 2C03 | 225 |
| 2B02 | 310 |
| 2B03 | 738 |
| 2A02 | 205 |
| 2A03 | 235 |
| 3A02 | 405 |
| 3A03 | 182 |
| 3C02 | 945 |
| 3C03 | 280 |

After determining respective measured areas for each Cell Sector-Special Number-Population Area, one may calculate the percentage of a ZIP Code measured area that is represented by a respective Cell Sector-Special Number-Population Area measured area. The resulting percentage of ZIP measured area may be applied to populations of respective Zip Code areas to present a weighted population of each respective Zip Code area that is located in a respective Cell Sector-Special Number-Population Area. In order to facilitate application of the invention, it is presumed in this example that there is a generally homogenous distribution of population within each Zip Code area.

One may assign routing for a respective Cell Sector to a particular PSAP (or other answering position) based upon which PSAP in a respective Cell Sector has the largest weighted population.

FIG. 4 is a tabulation of information and calculations associated with the information displayed in FIG. 3. In FIG. 4, a table 70 presents results of exemplary figures in practicing the present invention with respect to FIG. 3. Table 70 presents rows relating with respective Cell Sector-Special Number-Population Area Identifications (IDs). Table 70 also presents columns indicating various provided or calculated figures. CELL SECTOR refers to a respective Cell Sector, embodied in Cell Sector 1, Cell Sector 2 or Cell Sector 3 in FIG. 3. CELL SECTOR MEAS. AREA refers to measured area within a respective Cell Sector. AGENCY refers to a respective answering position, such as a PSAP. CELL SECTOR-SN-POP AREA ID refers to an identification indicating a respective Cell Sector-Special Number-Population Area in FIG. 3. AGCY-CELL SECTOR MEAS. AREA refers to the measured area of a respective Cell Sector Area in FIG. 3. ZIP CODE refers to a ZIP Code associated with or identifying a respective postal delivery zone or other population-related plot. ZIP MEAS. AREA refers to the measured area of a respective ZIP Code Area in FIG. 3. ZIP POP refers to population contained within a respective Zip Code Area in FIG. 3. CELL SECTOR-SN-POP MEAS. AREA refers to measured area of a respective Cell Sector-Special Number-Population Area in FIG. 3. % ZIP MEAS. AREA refers to the percentage of measured area of a respective Cell Sector-Special Number-Population Area that is within a respective Zip Code Area. WEIGHTED POP refers to Weighted Population, calculated by a product of % ZIP MEAS. AREA times ZIP POP for a particular Cell Sector-Special Number-Population Area. The highest value of WEIGHTED POP for each respective Cell Sector is indicated in FIG. 4 by an asterisk. ROUTE AGENCY refers to a respective answering position to which wireless communications will be routed via a respective Cell Sector. The answering position to which wireless communications will be routed via each Cell Sector is the answering position associated with the largest Weighted Population served by the Cell Sector. Cell Sector 1 serves a higher Weighted Population (1442.07) associated with PSAP C. Cell Sector 2 serves its highest Weighted Population (2107.69) associated with PSAP B. Cell Sector 3 serves its highest Weighted Population (1918.43) associated with PSAP C.

Figure 5:
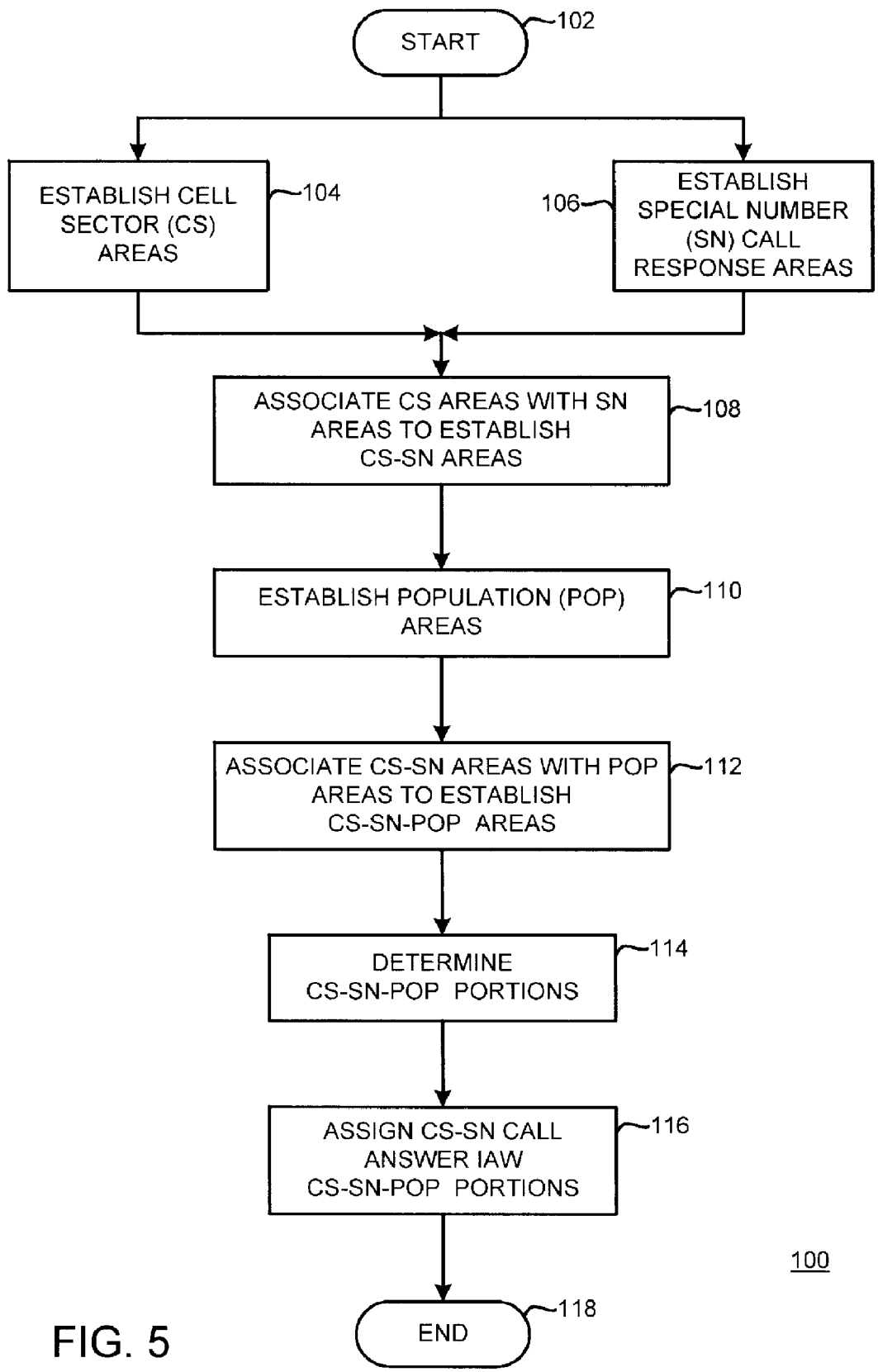
FIG. 5 is a flow chart illustrating the method of the present invention.

FIG. 5 is a flow chart illustrating the method of the present invention. In FIG. 5, a method 100 for assigning special number wireless call routing responsibilities among a plurality of special number call answering positions begins at a START locus 102. Each respective special number call answering position of the plurality of special number call answering positions has a respective designated special number service area. Method 100 continues with, in no particular order: (1) establishing a plurality of cell sector areas for wireless call service, as indicated by a block 104; and (2) establishing the respective special number service areas in the vicinities of the plurality of cell sector areas, as indicated by a block 106.

Method 100 continues with associating respective cell sector areas of the plurality of cell sector areas with the respective special number service areas to establish cell sector-special number areas, as indicated by a block 108.

Method 100 continues with establishing at least one population area in the vicinity of the cell sector-special number areas, as indicated by a block 110.

Method 100 continues with associating the cell sector-special number areas with the at least one population area to establish cell sector-special number-population areas, as indicated by a block 112.

Method 100 continues with determining portions of population attributed to each respective the cell sector-special number-population area, as indicated by a block 114.

Method 100 continues with assigning the responsibilities in proportion with the portions of population, as indicated by a block 116.

Method 100 terminates at an END locus 118.

It is to be understood that, while the detailed drawings and specific examples given describe embodiments of the invention, they are for the purpose of illustration only, that the method and system of the invention are not limited to the precise details and conditions disclosed and that various changes may be made therein without departing from the spirit of the invention which is defined by the following claims:

The invention claimed is:

1. A method for assigning emergency service wireless call routing responsibilities among a plurality of emergency service call answering positions; each respective emergency service call answering position of said plurality of emergency service call answering positions having a respective designated emergency service area; said emergency service wireless call routing being effected via a plurality of cell sector areas; the method comprising:
   (a) associating respective cell sector areas of said plurality of cell sector areas with said respective emergency service areas to establish cell sector-emergency service areas;
   (b) establishing at least one population area in the vicinity of said cell sector-emergency service areas;
   (c) associating said cell sector-emergency service areas with said at least one population area to establish cell sector-emergency service-population areas;
   (d) determining portions of population attributed to each respective said cell sector-emergency service-population area; and
   (e) assigning said responsibilities in proportion with said portions of population.

2. A method for assigning emergency service wireless call routing responsibilities among a plurality of emergency service call answering positions as recited in claim 1 wherein said establishing said cell sector-emergency service areas is effected using a computing apparatus employing a geographic information service program.

3. A method for assigning emergency service wireless call routing responsibilities among a plurality of emergency service call answering positions as recited in claim 1 wherein said establishing said cell sector-emergency service-population areas is effected using a computing apparatus employing a geographic information service program.

4. A method for assigning emergency service wireless call routing responsibilities among a plurality of emergency service call answering positions as recited in claim 1 wherein said associating is effected using a clipping capability of a geographic information service program.

5. A method for assigning emergency service wireless call routing responsibilities among a plurality of emergency service call answering positions as recited in claim 1 wherein said at least one population area is represented in a postal delivery zone plan.

6. A method for assigning emergency service wireless call routing responsibilities among a plurality of emergency service call answering positions as recited in claim 2 wherein said establishing said cell sector-emergency service-population areas is effected using a computing apparatus employing a geographic information service program.

7. A method for assigning emergency service wireless call routing responsibilities among a plurality of emergency service call answering positions as recited in claim 6 wherein said associating is effected using a clipping capability of a geographic information service program.

8. A method for assigning emergency service wireless call routing responsibilities among a plurality of emergency service call answering positions as recited in claim 7 wherein said at least one population area is represented in a postal delivery zone plan.

9. A system for assigning emergency service wireless call routing responsibilities among a plurality of emergency service call answering positions; each respective emergency service call answering position of said plurality of emergency service call answering positions having a respective designated emergency service area; said emergency service wireless call routing being effected via a plurality of cell sector areas; the system comprising: at least one computing apparatus; said at least one computing apparatus operating to effect associating respective cell sector areas of said plurality of cell sector areas with said respective emergency service areas to establish cell sector-emergency service areas; operating to effect establishing at least one population area in the vicinity of said cell sector-emergency service areas; operating to effect associating said cell sector-emergency service areas with said at least one population area to establish cell sector-emergency service-population areas; operating to effect determining portions of population attributed to each respective said cell sector-emergency service-population area; and operating to effect assigning said responsibilities in proportion with said portions of population.

10. A system for assigning emergency service wireless call routing responsibilities among a plurality of emergency service call answering positions as recited in claim 9 wherein said establishing said cell sector-emergency service areas is effected using said at least one computing apparatus employing a geographic information service program.

11. A system for assigning emergency service wireless call routing responsibilities among a plurality of emergency service call answering positions as recited in claim 10 wherein said establishing said cell sector-emergency service-population areas is effected using said at least one computing apparatus employing a geographic information service program.

12. A system for assigning emergency service wireless call routing responsibilities among a plurality of emergency service call answering positions as recited in claim 11 wherein said associating is effected using a clipping capability of a geographic information service program.

* * * * *